United States Patent
Hovland et al.

(10) Patent No.: US 11,179,621 B2
(45) Date of Patent: Nov. 23, 2021

(54) ATHLETIC TIMING DEVICE

(71) Applicants: Peter N. Hovland, Leonard, MI (US); Paul David Huch, Rochester, MI (US)

(72) Inventors: Peter N. Hovland, Leonard, MI (US); Paul David Huch, Rochester, MI (US)

(73) Assignees: Peter N. Hovland, Leonard, MI (US); Paul David Huch, Rochester, MI (US)

( * ) Notice: Subject to any disclaimer, the term of this patent is extended or adjusted under 35 U.S.C. 154(b) by 350 days.

(21) Appl. No.: 15/945,986

(22) Filed: Apr. 5, 2018

(65) Prior Publication Data
US 2019/0308085 A1    Oct. 10, 2019

(51) Int. Cl.
| | |
|---|---|
| G04F 10/00 | (2006.01) |
| A63B 71/06 | (2006.01) |
| G01P 3/50 | (2006.01) |
| A63B 24/00 | (2006.01) |

(52) U.S. Cl.
CPC ...... *A63B 71/0686* (2013.01); *A63B 24/0062* (2013.01); *G01P 3/50* (2013.01); *A63B 2024/0068* (2013.01); *A63B 2071/0694* (2013.01); *A63B 2220/36* (2013.01); *G04F 10/00* (2013.01)

(58) Field of Classification Search
CPC ............... A63B 21/153; A63B 21/154; A63B 2024/0068; A63B 2220/36; G04F 10/00; G01P 3/50
USPC ................................ 77/1.37, 1.38; 434/254
See application file for complete search history.

(56) References Cited

U.S. PATENT DOCUMENTS

| | | | | |
|---|---|---|---|---|
| 5,349,569 A | * | 9/1994 | Tanaka ............... | A63B 71/0686 200/52 R |
| 5,391,080 A | * | 2/1995 | Bernacki ............... | A63B 69/12 434/254 |
| 5,713,792 A | * | 2/1998 | Ohzono ............... | A63B 21/153 463/7 |
| 5,813,945 A | * | 9/1998 | Bernacki ............... | A63B 21/153 434/247 |
| 5,938,565 A | * | 8/1999 | Bernacki ............... | A63B 21/153 434/247 |
| 10,765,900 B2 | * | 9/2020 | Lacey ................ | A63B 21/4035 |
| 2010/0197467 A1 | * | 8/2010 | Hector .................... | A63B 69/12 482/55 |
| 2010/0233664 A1 | * | 9/2010 | Wroclawsky ...... | A63B 21/4009 434/247 |
| 2013/0267384 A1 | * | 10/2013 | Eldridge ............ | A63B 21/0058 482/5 |
| 2014/0038777 A1 | * | 2/2014 | Bird ..................... | A63B 21/151 482/5 |
| 2014/0097285 A1 | * | 4/2014 | Chang .................. | B65H 59/02 242/421 |
| 2015/0290517 A1 | * | 10/2015 | Saleh .................... | A63B 69/12 434/254 |

(Continued)

*Primary Examiner* — Sean Kayes
(74) *Attorney, Agent, or Firm* — Dority & Manning, P.A.

(57) ABSTRACT

A timing device is provided herein. The timing device includes a housing defining an aperture in a surface thereof. An elongated member is extendable from the housing. A wheel is attached to an interior surface of the housing. An encoder is operably coupled to the wheel and is configured to calculate a rotational velocity of the wheel. A controller is configured to calculate a linear velocity of the elongated member based on the rotational velocity of the wheel.

20 Claims, 12 Drawing Sheets

(56) References Cited

U.S. PATENT DOCUMENTS

2016/0121194 A1\* 5/2016 Chuang .............. A63B 21/0442
　　　　　　　　　　　　　　　　　　　　　　434/254
2018/0243599 A1\* 8/2018 Lacey ................ A63B 24/0087

\* cited by examiner

ATHLETIC TIMING DEVICE

FIELD OF THE INVENTION

The present disclosure generally relates to timing devices, and more particularly, to athletic timing devices.

BACKGROUND OF THE INVENTION

Timing devices are commonly utilized in training and competitions in various athletic events. In some instances, it may be desirable to have a more accurate timing device.

SUMMARY OF THE INVENTION

According to one aspect of the present disclosure, a timing device is provided herein. The timing device includes a housing defining an aperture in a surface thereof. An elongated member is extendable from the housing. A wheel is attached to an interior surface of the housing. An encoder is operably coupled to the wheel and is configured to calculate a rotational velocity of the wheel. A controller is configured to calculate a linear velocity of the elongated member based on the rotational velocity of the wheel.

According to another aspect of the present disclosure, a timing device is provided herein. The timing device includes a housing having a first portion and a second portion separated by a divider. The first portion defines an aperture in the housing. An elongated member is extendable from the housing through the aperture and is configured to couple to a user. A reel is disposed within the first portion of the housing and is configured to wind the elongated member therearound. An encoder is operably coupled with the reel and is configured to calculate a rotational velocity of the reel as the elongated member is unwound from the reel. A controller is disposed within the second portion and is configured to calculate a linear velocity of the user based on the rotational velocity of a wheel.

According to yet another aspect of the present disclosure, a timing device is provided herein. The timing device includes a housing having a plurality of side surfaces, a top surface, and a bottom surface defining a compartment. The compartment has a first portion and a second portion separated by a divider. The top surface is rotatable to provide access to the compartment. An elongated member is extendable from the housing through an aperture in the housing. A reel is disposed within the first portion of the housing. The elongated member is wound around the reel. A controller is operably coupled to the elongated member and is configured to calculate a linear velocity at which the elongated member is extended from the housing.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
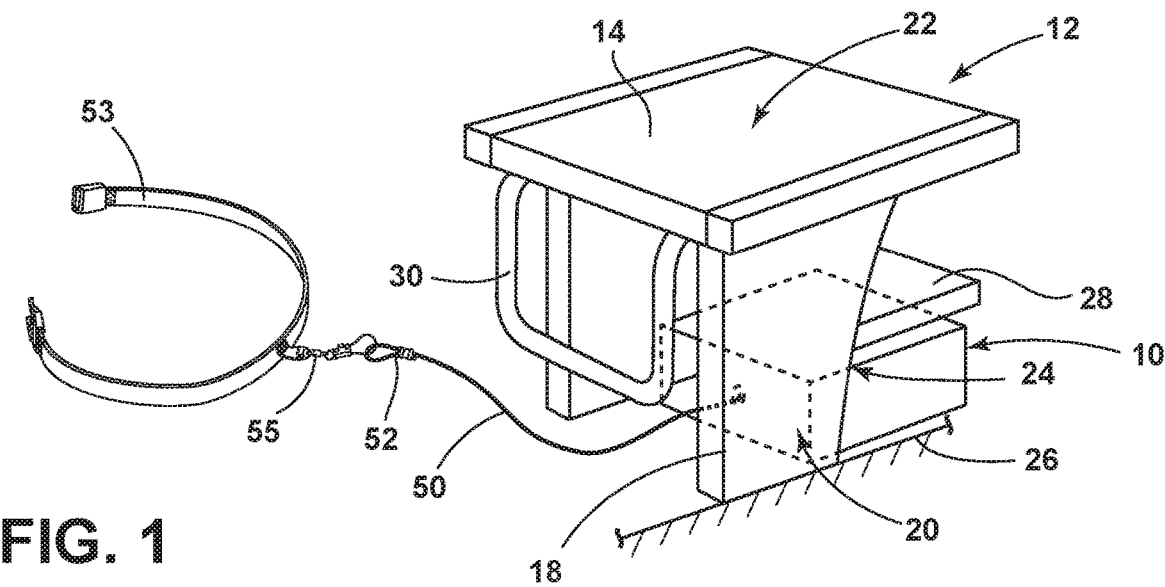
FIG. 1 is a rear perspective view of a swimming starting block and timing device attached thereto, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a timing device. The timing device utilizes an elongated member and may employ a device for calculating the velocity at which the elongated member is extended from the timing device. The timing device may be manufactured at low costs when compared to timing devices currently available. Moreover, the timing device may update an instantaneous velocity of the user at more frequent rates than currently available timing devices.

Figure 2:
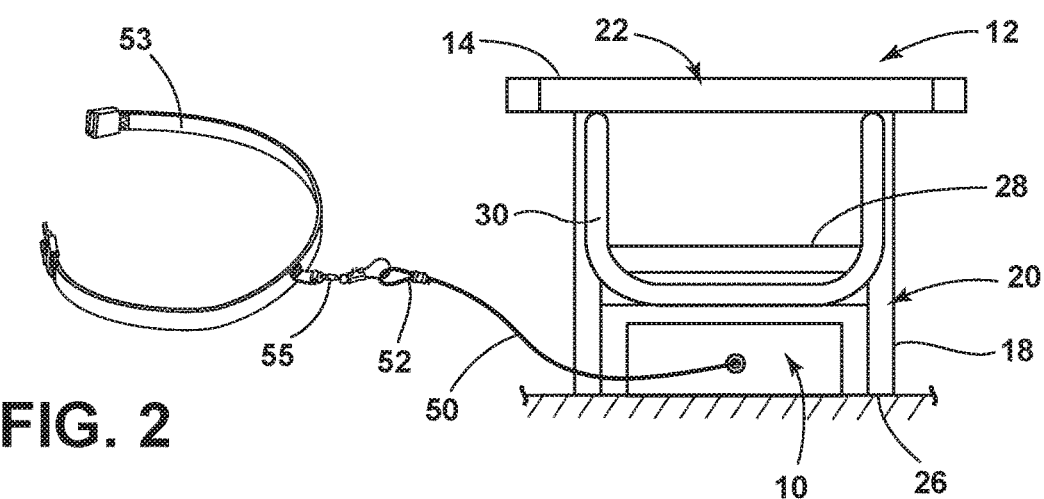
FIG. 2 is a front plan view of the starting block and timing device, according to some examples.
Figure 3:
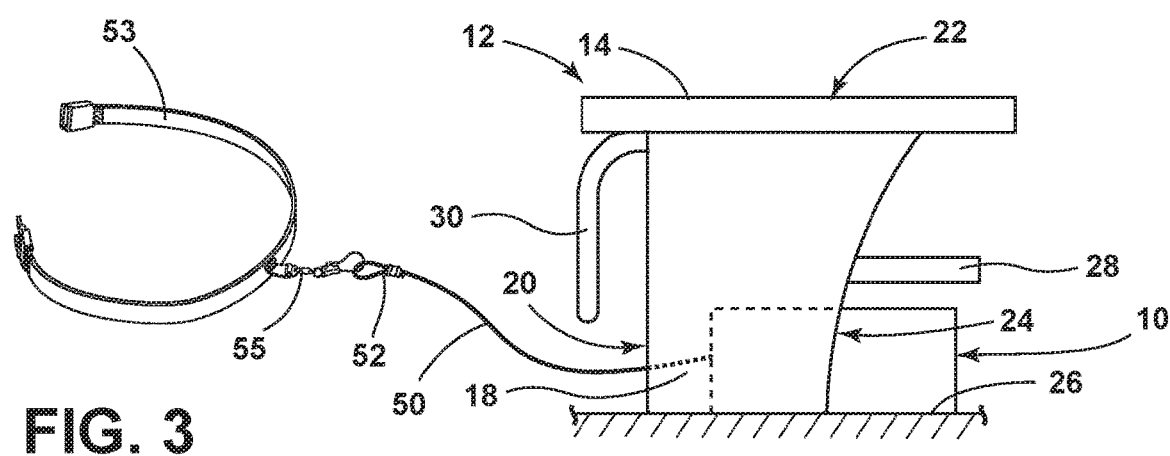
FIG. 3 is a side plan view of the starting block and timing device, according to some examples.
Figure 5:
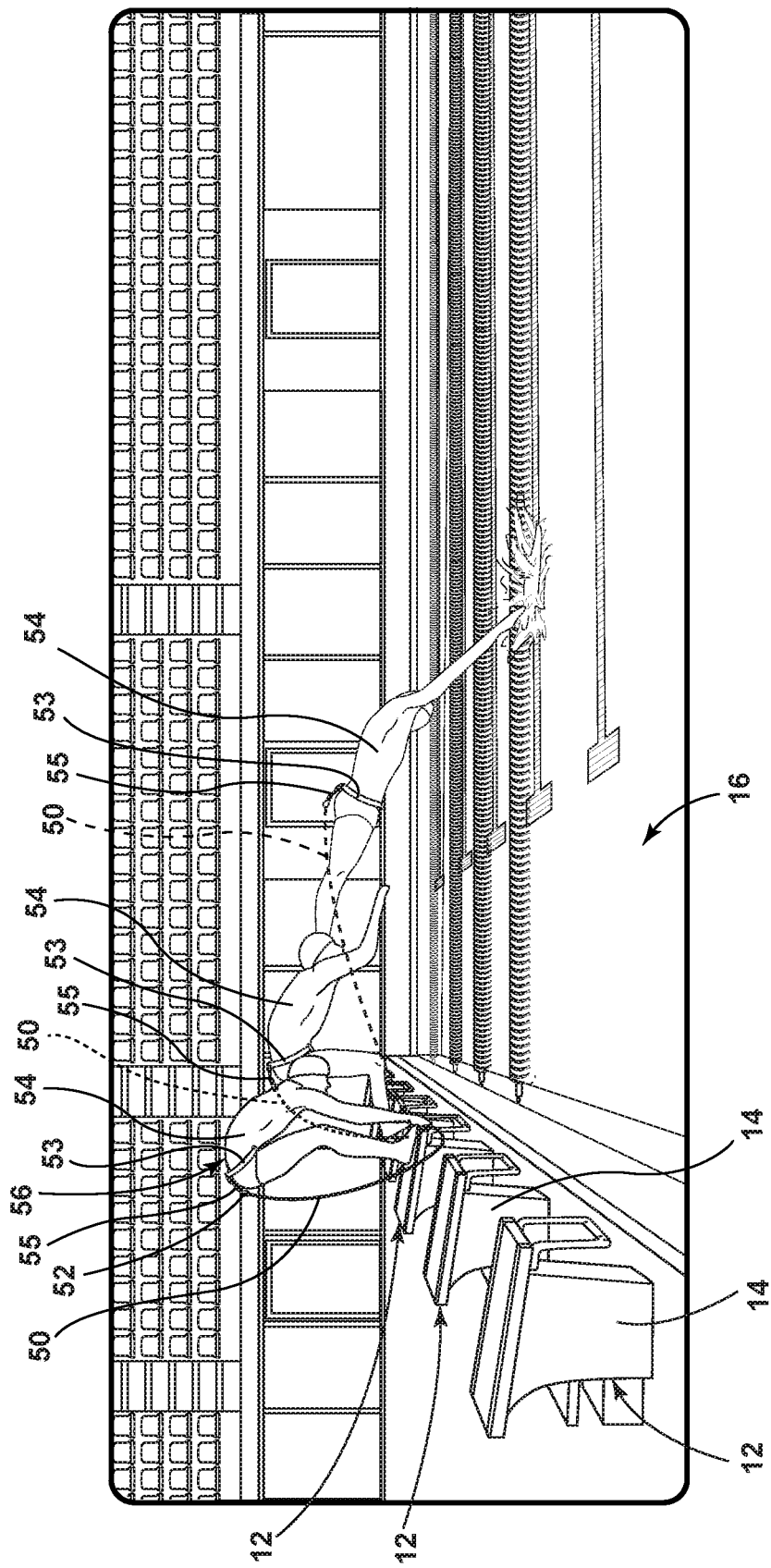
FIG. 5 is a side perspective view of a user utilizing the timing device, according to some examples.

Referring to FIGS. 1-3, a timing device 10 may be attached to various starting blocks 12 and/or proximate starting locations for various timed events. For example, as illustrated in FIGS. 1-3, the timing device 10 may be attached to a swimming-starting platform 14. The platform 14 is suitably rested or mounted on a deck surface 26 adjacent to a pool 16 (FIG. 5). The platform 14 may include a base 18, which may include a lower region 20, an upper region 22, and a middle region 24. The lower region 20 may be operably coupled to the deck surface 26 adjacent to the pool 16. The upper region 22 may include the platform 14 from which a swimmer begins. The middle region 24 may include a step 28 to facilitate the climbing onto the platform 14.

A backstroke arm structure 30 may be mounted on the starting block 12. The backstroke arm structure 30 may extend forwardly and/or downwardly of the platform 14. As illustrated in FIG. 1, the timing device 10 may also be mounted to the front portion of the platform 14. However, as illustrated in FIG. 2, the timing device 10 may be attached to the backstroke arm structure 30, or, as illustrated in FIG. 3, the timing device 10 may be disposed proximate the platform 14. It will be appreciated that the timing device 10 may be disposed on any portion of the starting block 12 and/or in any other location proximate the starting location of a user without departing from the scope of the present disclosure. As will be discussed in more detail below, an elongated member 50 is extendable from a housing 58 of the timing device 10. The elongated member 50 may extend above, below, inward, and/or outward of the starting block 12, and/or any other starting location.

Figure 4:
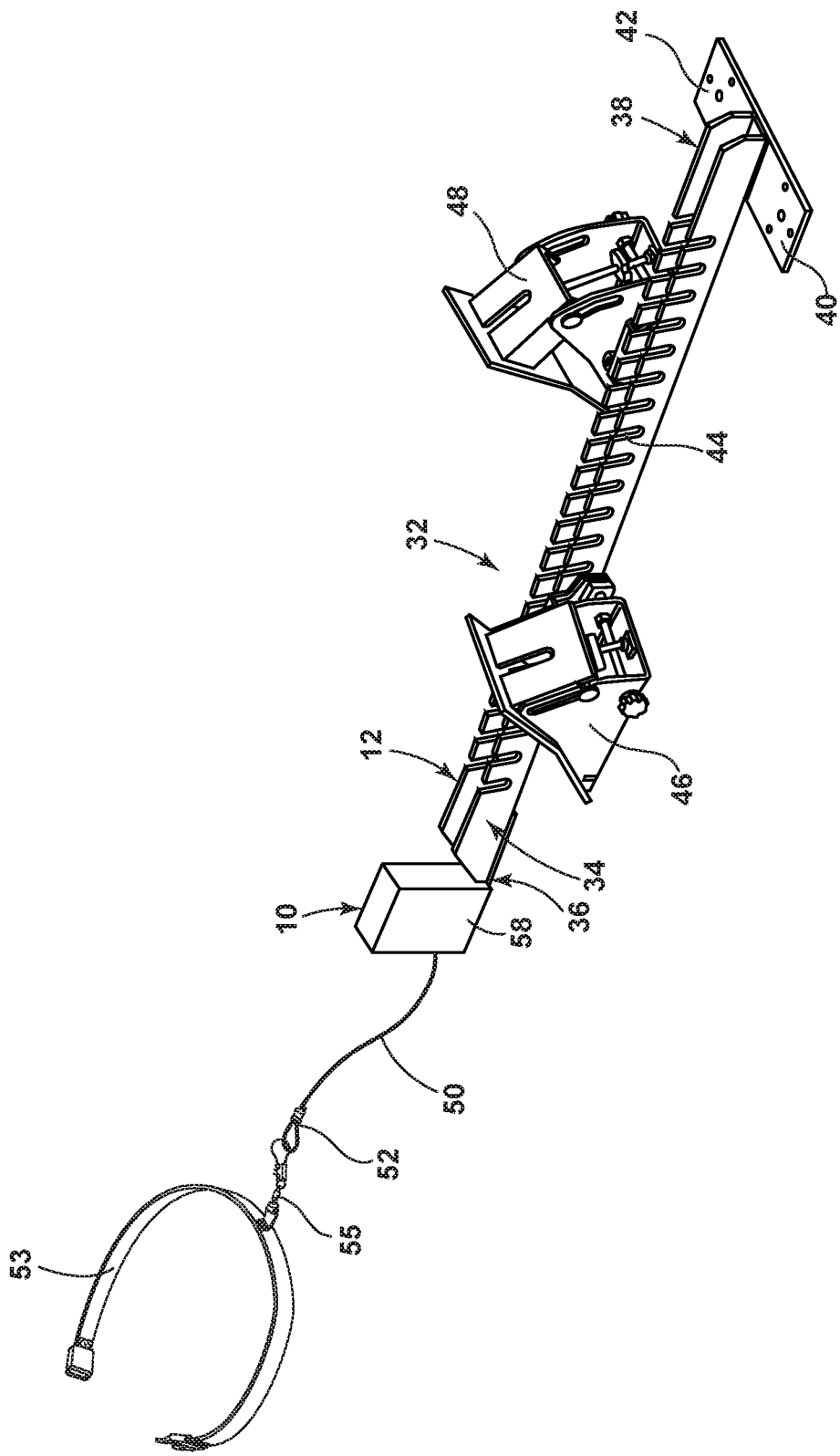
FIG. 4 is a rear perspective view of a track starting block with the timing device attached to a front portion thereof, according to various examples.

Referring to FIG. 4, the timing device 10 may be coupled to any other type of starting device, such as a track starting block 32. The starting block 32 may include an elongated frame 34 having a longitudinal axis (not shown), which extends between a first end portion 36 and a second end portion 38 of the frame 34. The frame 34 is adapted to be attached to a ground at one or both end portions 36, 38 of the frame 34. In the illustrated example, the frame 34 has mounted elements 40, 42 having holes, wherein a fastener, for instance, pins or spikes, may be inserted into the ground and thereby fix the frame 34 to the ground.

As illustrated in FIG. 4, the frame 34 is made of a profile having U-shaped profile slits 44 arranged there along having a mutual spaced apart relationship along the elongated frame 34. The slits 44 are adapted to receive take-off blocks 46, 48 therein that may be individually adjusted along the frame 34. The timing device 10 may be coupled to the first end portion 36 of the block 32. It will be appreciated that the timing device 10 provided herein may be used by any type of user for timing any event without departing from the scope of the present disclosure. Accordingly, in some implementations, the timing device 10 may not be attached to a block 12, 32 while in use.

Figure 9:
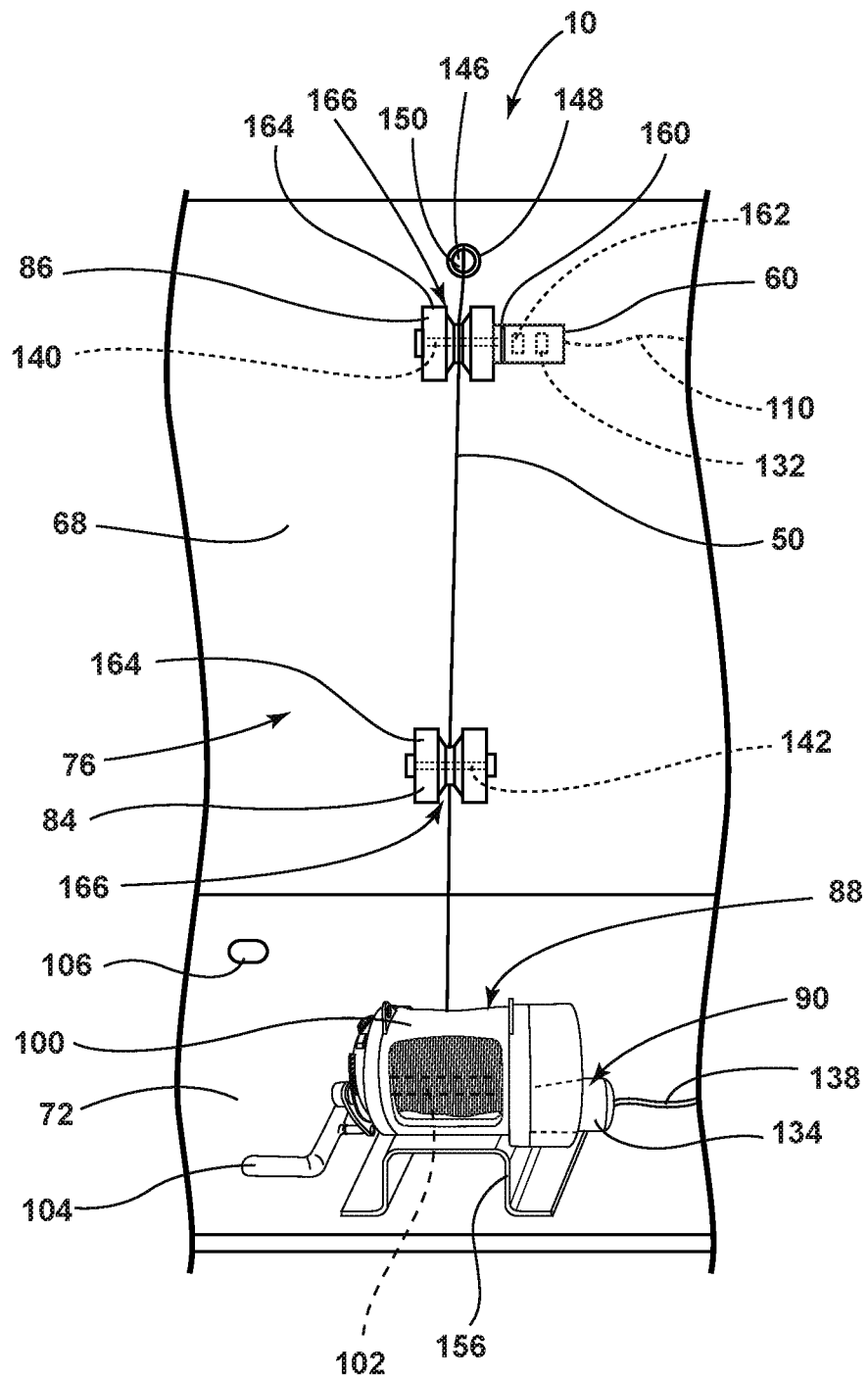
FIG. 9 is a partial perspective view of the timing device having a reel and first and second wheels each operably coupled to an elongated member, according to some examples.

Referring to FIGS. 1-5, the timing device 10 includes the elongated member 50 that may be attached to a user 54. The elongated member 50 may be in the form of a string, fish line, band, tube, cord, and/or any other material that may be disposed around a spool 102 (FIG. 9). Moreover, the elongated member 50 may be substantially inelastic in some examples. In alternate examples, the elongated member 50 may be elastic. In some examples, a clip 52 may be disposed at one end portion of the elongated member 50 and may be attached to clothing worn by the user 54. In other examples, a belt 53 or any other attachment device may be coupled to the elongated member 50 for removable fixation of the elongated member 50 to the user 54. A swivel assembly 55 may be disposed between the elongated member 50 and the belt 53 for releasably coupling the belt 53 to the elongated member 50.

Figure 6:
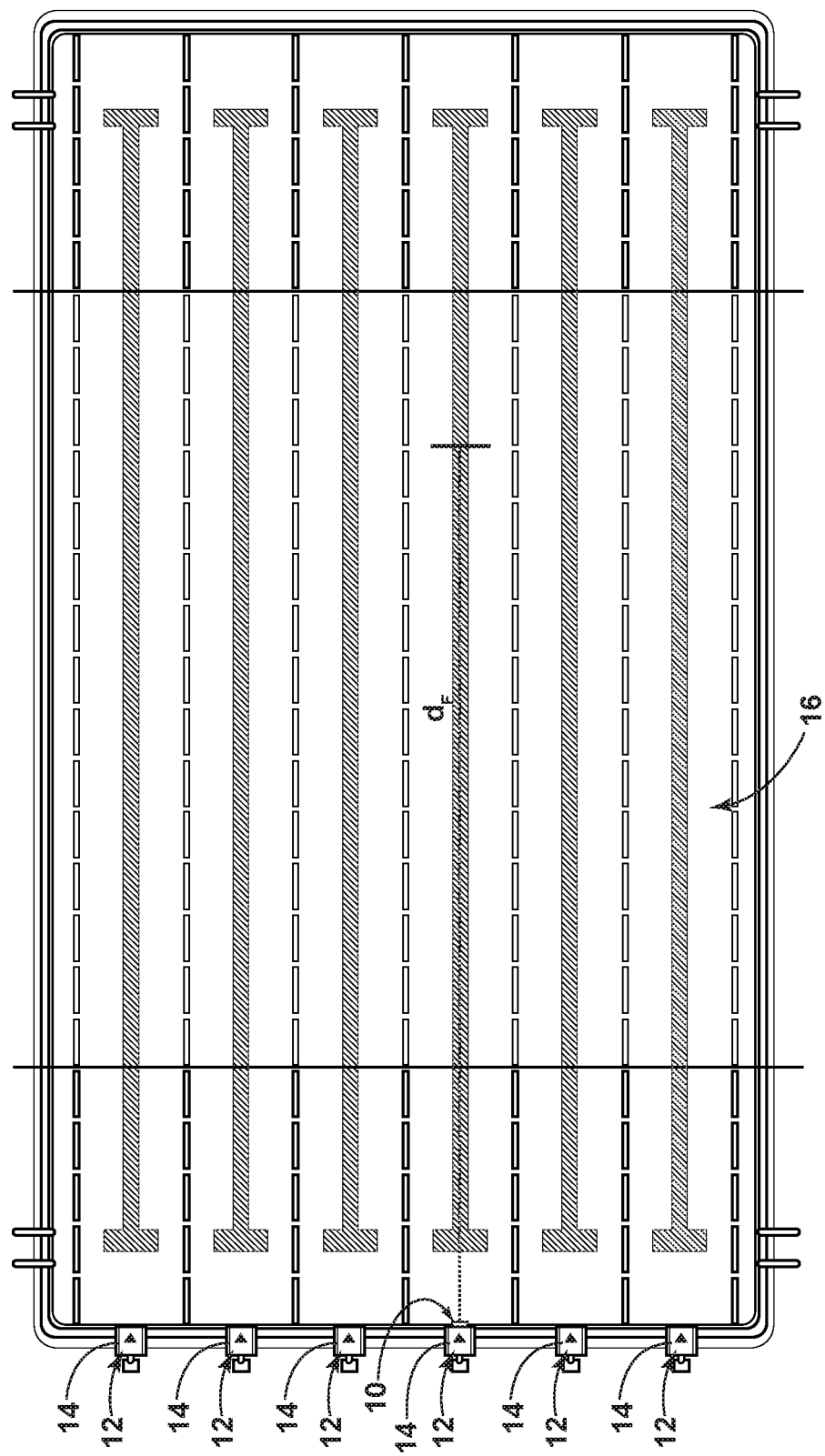
FIG. 6 is a top plan view of a competition swimming pool, according to some examples.
Figure 13:
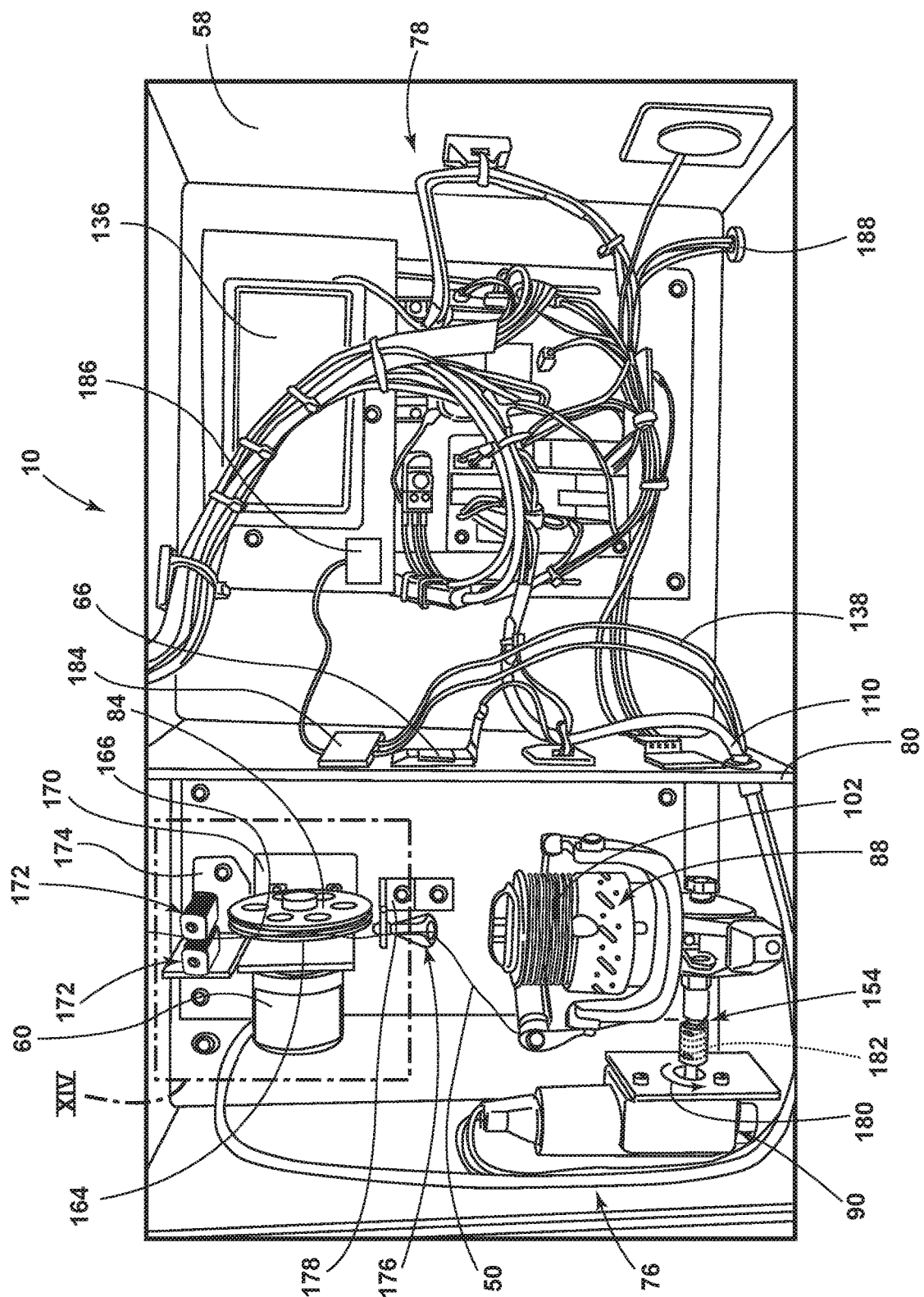
FIG. 13 is a top perspective view of the timing device, according to some examples.

With reference to FIGS. 5 and 6, the user 54 begins in the starting position 56 with the elongated member 50 attached to the user 54 and extending an initial distance $d_0$ (FIG. 7) from the housing 58 of the timing device 10. Once the user 54 is further from the housing 58 than they were at the initial distance $d_0$, the elongated member 50 unreels from within a housing 58 of the timing device 10. As the elongated member 50 is extended, an encoder 60 (FIG. 8) within the timing device 10 measures a revolution per minute of a wheel 84, 86 that contacts the elongated member 50. The encoder 60 determines the revolutions of the wheel 84, 86, which is sent to a controller 62 (FIG. 13). Based on the revolutions of the wheel 84, 86 over time, data about the user 54 may be generated, stored, and/or calculated for each distance covered by the user 54.

Referring still to FIGS. 5 and 6, the timing device 10 may be configured to store data from the encoder 60 and calculate various information about the user 54 over a predefined distance $d_F$. For example, the timing device 10 may be configured to track a user's 54 velocity for a predefined distance $d_F$, such as 15 meters. Such a calculation may be difficult to continually calculate through other means currently known by one of ordinary skill in the art. In some examples, the elongated member 50 extends the initial distance $d_0$ from the housing 58 of the timing device 10 for attaching the elongated member 50 to the user 54.

With further reference to FIG. 5, in some examples, the user 54 of the timing device 10 may use the device independently. In some instances, the timing device 10 may be attached to the user 54, as provided herein, and the user 54 may initiate a timing sequence through any means known in the art, such a start button 122 (FIG. 8), an application 158 (FIG. 8) on the electronic device 64 (FIG. 8), etc. Once the timing sequence has been initiated, the user 54 may move to their starting location, such as on the platform 14, and the elongated member 50 may be wound into the housing 58 until any slack in the elongated member 50 between the housing 58 and the user 54 is removed. In some instances, the sequence proceeds once the elongated member 50 reaches a predefined tension. Then, the timing device 10, through the speaker 96, may direct the user 54 to prepare for the start of the timing sequence. After, the timing device 10 may beep or otherwise indicate to the user 54 that they are to begin extending the elongated member 50 from the housing 58. In some examples, the amount of time between to prepare for the start command and the beginning of the timing sequence may be varied between a predefined set of times. For example, the time between the two commands may be between 0.5 seconds and 1.5 seconds in some cases. It will be appreciated, however, that the predefined set of times may be any amount time without departing from the scope of the present disclosure. In other cases, the user 54 may set the time between the two commands.

Figure 7:
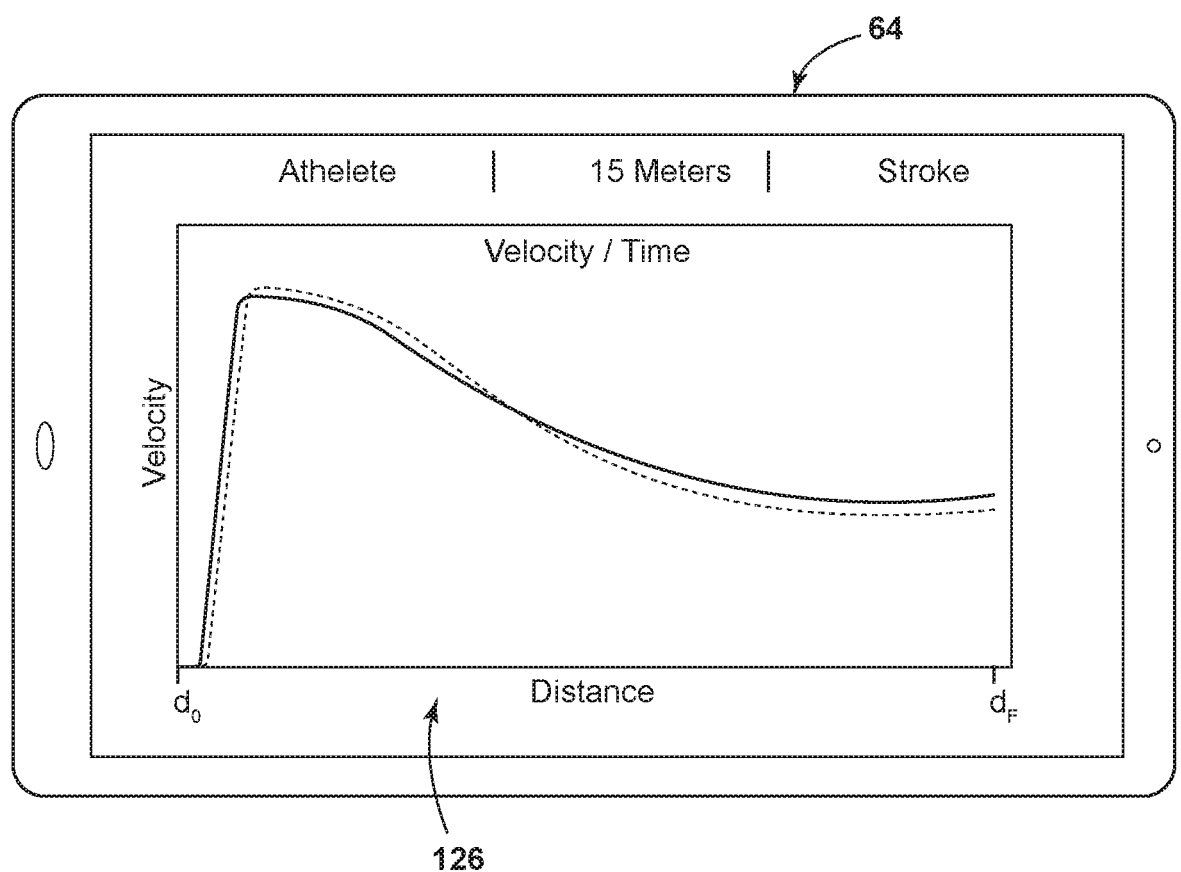
FIG. 7 is a front plan view of an exemplary electronic device that may communicate with the timing device with various information provided on a display of an electronic device, according to some examples.
Figure 8:
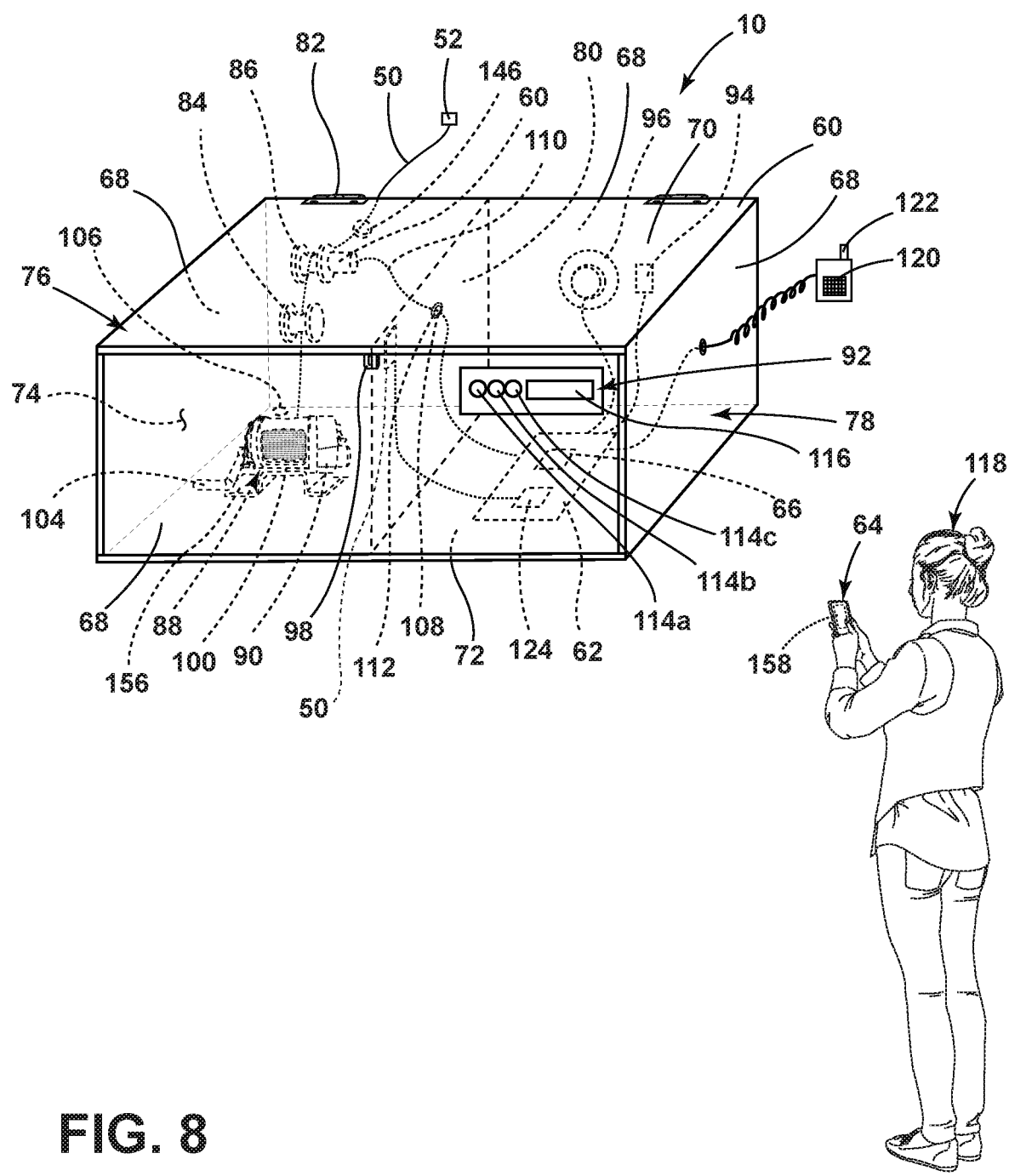
FIG. 8 is a perspective view of the timing device and a person utilizing the electronic device that may be operably coupled with the timing device, according to some examples.

With reference to FIGS. 6 and 7, as provided in more detail below, the timing device 10 may communicate with an electronic device 64 through one or more wireless transceivers 66 (FIG. 8). As the elongated member 50 is extended from the housing 58, the electronic device 64 may receive the various data collected by the controller 62. For example, the electronic device 64 may receive data relating to the time difference between the initiation of the clock 124 (FIG. 8) and the initial extension of the elongated member 50 from the housing 58, which may be calculated as a reaction time of the user 54. The timing device 10 may also calculate and/or store a user's 54 distance, velocity, acceleration, and/or any other desired collected and/or calculated data.

Moreover, as exemplarily illustrated in FIG. 7, the electronic device 64 may display the user's 54 velocity over the desired predefined distance $d_F$. Additionally, the electronic device 64 can store data about a plurality of users 54, such as their name, the predefined distance $d_F$, an event and/or stroke, etc. It will be appreciated, however, that any other data may be provided to the electronic device 64. It will further be appreciated that the data can be used in any manner and/or for any computation without departing from the scope of the present disclosure. Additionally, the timing device 10 may calculate and/or store various instances in which a user 54 completes the timing sequence while attached to the timing device 10. The various timing sequences may be displayed on a common graph to illustrate variances in performance between instances. Moreover, various users 54 may have their data displayed simultaneously in order to compare various users' 54 performances.

In some cases, three various times may be calculated and stored by the timing device 10, including a reaction time, which as provided herein, may be calculated as the time between the start of the timing sequence and the moment the elongated member 50 begins to extend from the housing 58. The timing device 10 may also store a total time, which may be the time from the initiation of the timing sequence until the elongated member 50 has been extended a predefined distance from the housing 58 and/or the encoder 60. Lastly, the timing device 10 may also store an "activity time," which may be the total time minus the reaction time.

Referring to FIG. 8, the housing 58 may have a plurality of side surfaces 68, a top surface 70, and a bottom surface 72 that defines a compartment 74. The compartment 74 may have a first portion 76 and a second portion 78 separated by a divider 80. It will be appreciated, however, that the compartment 74 may have a single portion or more than two portions in other examples without departing from the scope of the present disclosure. According to some examples, an exterior surface 68, 70, 72 of the housing 58 may be pivotable about a hinge 82 to provide access to the first and/or second portions 76, 78 of the housing 58. Moreover, a latch 98 may be disposed on an opposing side of the housing 58 for releasably maintaining the pivotable surface 68, 70, 72 in a locked and an unlocked position. For example, the timing device 10 can be provided with a spring biased push-push latch 98 so that the top surface 70 can be released from the closed position by pressing on the top surface 70 to allow the top surface 70 to move to an open position. It will be appreciated that the hinge 82 and the latch 98 may be disposed on any portion 76, 78 of the housing 58 without departing from the scope of the present disclosure.

Water resistant components of the timing device 10 may be disposed within the first portion 76. For example, one or more wheels 84, 86, a reel 88, the encoder 60, and a motorized drive assembly 90 that is coupled to the reel 88 may be disposed in the first portion 76. The controller 62, a user interface 92, a light source 94, and/or a speaker 96 may be disposed within the second portion 78.

The elongated member 50 may be wound around the reel 88. As the user 54 moves further from the housing 58 with the elongated member 50 attached to them, the elongated member 50 may extend from the reel 88. As the elongated member 50 is unreeled from the spool 102 of the reel 88, the elongated member 50 may pass on an underside of a first wheel 84. The elongated member 50 may then be directed to a second wheel 86. The elongated member 50 then exits the timing device 10 through an aperture 146 defined by the housing 58. The encoder 60 may be operably coupled to the first and/or second wheel 86. As the elongated member 50 is unreeled from the spool 102 and/or rewound around the spool 102, the encoder 60 may determine the number of revolutions of the first and/or second wheel 84, 86. Since the first and/or second wheel 84, 86 has a predetermined radius, the encoder 60 may calculate the length of the elongated member 50 extended from the housing 58.

As the elongated member 50 is rewound around the spool 102, water may be on the elongated member 50 and brought into the first portion 76. Accordingly, a drain 106 may be disposed on a bottom portion of the housing 58 for water removal.

The encoder 60 is operably coupled to the controller 62, which may be disposed within the second portion 78 of the housing 58. Accordingly, the divider 80 may define a void 108 through which one or more wires 110 may be disposed. Moreover, a gasket 112 may be disposed within the void 108. The gasket 112 may be a resilient elastomeric gasket for providing a substantially watertight seal.

Referring still to FIG. 8, the user interface 92 may include one or more switches 114*a*, 114*b*, 114*c* configured to control one or more features of the timing device 10, such as a power switch 114*a*, a reset switch 114*b*, and/or a starting switch 114*c*. The user interface 92 may further include a display 116. The display 116 may provide various information to the user 54 and/or any other person 118 proximate the housing 58. For example, the display 116 may provide information about a user 54 who is attached to the elongated member 50, a distance upon which the timing device 10 is programmed to measure, a velocity/amount of time and/or predefined distance $d_F$, etc.

The speaker 96 may be disposed within the housing 58 and configured to produce audible sounds. The audible sound may provide the commands discussed herein and/or signify a starting time for the user 54. Once the speaker 96 initiates the sound, the timing device 10 may start a clock 124 therein. According to some examples, the time between the audible sound and the extension of the elongated member 50 from the timing device 10 may be calculated as a reaction time of the user 54. In other words, the time in which the user 54 needed to begin forward movement upon hearing the audible sound. In other examples, a person 118 proximate the user 54 may produce the audible sound and/or use a secondary device that is coupled to the timing device 10 for producing the audible noise. For example, a standard timing system may be coupled to the timing device 10 for producing the audible noise and/or an electronic device 64 may be utilized.

In some examples, the timing device 10 may further include the light source 94 and/or a microphone 120. A person 118 proximate the timing device 10, such as a coach, scout, etc., may utilize the microphone 120 and a start button 122 thereon for starting the clock 124 within the timing device 10. The light source 94 may also illuminate when the clock 124 begins to signify the initiation of the timing event. The light source 94 may include any form of light source 94. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the timing device 10.

Referring still to FIG. 8, the timing device 10 may further include one or more of the wireless communication transceivers 66 that may be configured to interact with the electronic device 64. The wireless transceiver 66 (e.g., a BLUETOOTH module, a ZIGBEE transceiver, a Wi-Fi transceiver, an IrDA transceiver, an RFID transceiver, etc.) is configured to communicate with a compatible wireless transceiver 66 of the proximate person's 118 and/or the user's electronic device 64. Additionally or alternatively, the timing device 10 may communicate with the electronic device 64 over a wired connection, such as via a USB connection. In various examples, the timing device 10 may communicate with the electronic device 64 through a wireless network. Accordingly, the network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 2.11, etc.), local area networks (LAN), and/or wide area networks (WAN), including the Internet, providing data communication services.

The electronic device 64 may include a cell phone, a tablet, a key fob, wearable device (e.g., fitness band, watch, glasses, jewelry, wallet), apparel (e.g., a tee shirt, gloves, shoes or other accessories), personal digital assistant, headphones and/or other devices capable of wireless transmission (e.g., radio frequency, Bluetooth, ultrasonic). In one non-limiting example, the wireless communication transceivers 66 may be a Bluetooth™ RN4020 module or an RN4020 Bluetooth™ low energy PICtail board configured to communicate with the electronic device 64 using Bluetooth™ low energy signals. The wireless communication transceivers 66 may include a transmitter and a receiver to transmit and receive wireless signals (e.g., Bluetooth™ signals) to and from the electronic device 64. It will be appreciated that the wireless communication transceivers 66 may utilize other forms of wireless communication between with the electronic device 64 and other wireless communication transceivers 66, such as Wi-Fi™.

The wireless communication transceivers 66 may be positioned on or within the controller 62. The controller 62 may be a dedicated controller or may be a shared controller (e.g., for multiple timing devices 10). The controller 62 may include a processor 126 (FIG. 13) and a memory 128 (FIG. 13) for executing stored routines 130 (FIG. 13) or for storing information (e.g., related to performance data of the user 54 and/or the electronic device 64). The wireless communication transceiver 66 is configured to communicate with the processor 126 such that one or more routines 130 stored in the memory 128 are activated.

With reference to FIGS. 7 and 8, an application 158 on the electronic device 64 may be configured to utilize a device link interface to interact with the timing device 10. When connected to the timing device 10, the application 158 may be configured to utilize information from the controller 62. For example, the application 158 may create various data displays (e.g., charts, graphs, etc.) that are specific to a user 54 or group of users 54. The application 158 may also store information about one or more users 54 therein and/or the performance history, or data, of one or more users 54.

Referring to FIG. 9, according to some examples, the reel 88 includes a main body 100 having opposing first and second (e.g. right-hand and left-hand) sides. The spool 102 is rotatably mounted to main body 100 via a spool axle and configured for manual actuation by a hand crank 104 disposed on the first side of main body 100. In some examples, the main body 100 may be adapted with a motorized drive assembly 90 that is attached to the second side of main body 100.

The encoder 60 may use at least two methods used for determining velocity from a signal provided by the encoder 60. The first method is to sum pulses over a fixed period of time (i.e., the frequency method). The calculation for this method is velocity=(sum of pulses/time interval)*(rotational distance of the first or second wheel 84, 86). The second method uses the time interval between successive pulses to determine an instantaneous velocity (i.e., the period method). The period method can give an updated velocity value as each pulse arrives from the encoder 60. In order to utilize either method, the encoder 60 may include a rotor 160, a pulse detection module 162, and a rotational calculation module 132. The rotor 160 is adapted to rotate with the first or second wheel 84, 86. To monitor its rotation, the encoder 60 may be provided in close proximity to the rotor 160. It will be appreciated that the encoder 60 described herein is exemplary and that the encoder 60 can be any device that outputs an event (i.e., a pulse) that is indicative of the rotational distance or rotational angle traveled by the rotating member without departing from the scope of the present disclosure.

According to some examples, the rotor 160 is formed as a timing gear consisting of magnetic material and a multiplicity of timing teeth, which protrude to provide the outer surface of the timing gear. The encoder 60 includes a sensor, which is composed of a permanent magnet and a coil, such that it can detect the rotation of the timing gear as a change in the magnetic resistance. The flux of the magnetic field formed by the permanent magnet is variable depending upon the relative position of the encoder 60 in relation to the teeth on the outer surface of the rotor 160. Since the teeth are arranged on the circumference of the rotor 160 at regular intervals, the output voltage becomes an alternating waveform, such as a sine wave. The voltage signal is then inputted into a wave shaping circuit, which shapes the alternating waveform into a pulse train signal. In this way, the pulse signal is indicative of the rotational distance that has been traveled by the rotating member. Although the above description references a particular type of rotor 160 and encoder 60, this is not intended as a limitation on the broader aspects of the present examples. On the contrary, other types of rotors 160 and encoder devices 60 (e.g., using an optical sensor) may be used to monitor the rotation of the first or second wheel 84, 86 and/or extensions and retractions of the elongated member 50 from the housing 58.

In some examples, the pulse detection module 162 stores a timestamp for each pulse detected. Based on this stored data, the rotational calculation module 132 is then able to determine rotational data for the first or second wheel 84, 86. The timestamp value stored in the temporary location is subtracted from a newly detected time stamp value. This time difference value is a delta time between the two pulses, which can, in turn, be used to compute rotational velocity for the rotating member (e.g., rotational velocity=distance between pulses/delta time). As each additional time stamp value arrives, it is stored in the data table and the previously stored value is subtracted to produce a new velocity value. In this way, the updated rate is equal to the incoming pulse stream rate. Based on the circumference of the portion of the first or second wheel 84, 86 that the elongated member 50 contacts, velocity data (or a rotational velocity) for the first or second wheel 84, 86 is computed. Likewise, acceleration data, and/or any other desired data, is computed for the first or second wheel 84, 86.

Referring still to FIG. 9, the reel 88 may be operably coupled to the motorized drive assembly 90. The motorized drive assembly 90 includes an electric motor 134 mounted to the reel 88. In some examples, the motor 134 is configured as a brushless motor that is operably coupled to a power source 136 via a power cable 138. According to some examples, the power cable 138 may couple to the controller 62 and/or another component within the timing device 10. Additionally, and/or alternatively, the power cable 138 may couple to a power source 136 that is external from the timing device 10.

With further reference to FIG. 9, the first and second wheels 84, 86 may be rotatable about respective first and second axles 140, 142. In some examples, the first and second axles 140, 142 are parallel to one another. In other examples, the first and second axles 140, 142 may be laterally and/or vertically offset from one another. Each of the first and second wheels 84, 86 has a cylindrical peripheral surface 164 in which a groove 166 is provided. The width of the groove 166 may be larger than the thickness of the elongated member 50. According to some examples, the elongated member 50 is wrapped around the spool 102, disposed below the second wheel 84, 86, and wrapped around a top portion of the first wheel 84 prior to exiting through the aperture 146 of the housing 58. The first and second wheels 84, 86 may be made of any practicable material. In some examples, the first and second wheels 84, 86 may be made of a material having a high frictional coefficient such that the linear length of the elongated member 50, when pulled from the housing 58, may be substantially equal to the linear distance that the first and second wheels 84, 86 rotate (i.e., there is minimal slip between the elongated member 50 and the first and/or second wheel 84, 86). Accordingly, a linear velocity at which the elongated member 50 is extended from the housing 58 may be calculated. As provided herein, the timing device 10 may include any number of wheels 84 without departing from the scope of the present disclosure. For example, in some instances, the timing device 10 may be free of any wheels, the timing device may have a single wheel 84, or the timing device may have more than one wheel 84, 86 disposed within the timing device 10.

In some examples, the reel 88 may be disposed on a bracket 156. The bracket 156 may be configured to couple the reel 88 to the bottom surface 72 of the housing 58, or any other second portion 78 of the housing 58. The bracket 156 is of sufficient height that a hand crank 104 of the reel 88 may rotate without contacting the bottom surface 72 of the housing 58.

Referring again to FIG. 9, a bearing 148 may be disposed within the aperture 146 that may be arranged generally perpendicular to a longitudinal axis of the elongated member 50. The bearing 148 may help reduce friction as the elongated member 50 moves through a central bore 150 of the bearing 148 and, consequently, the aperture 146. In some examples, the bearing 148 may include one or more needle rollers. However, it will be appreciated that any type of bearing, or another friction-reducing device, may be utilized within the aperture 146 without departing from the scope of the present disclosure.

Figure 10:
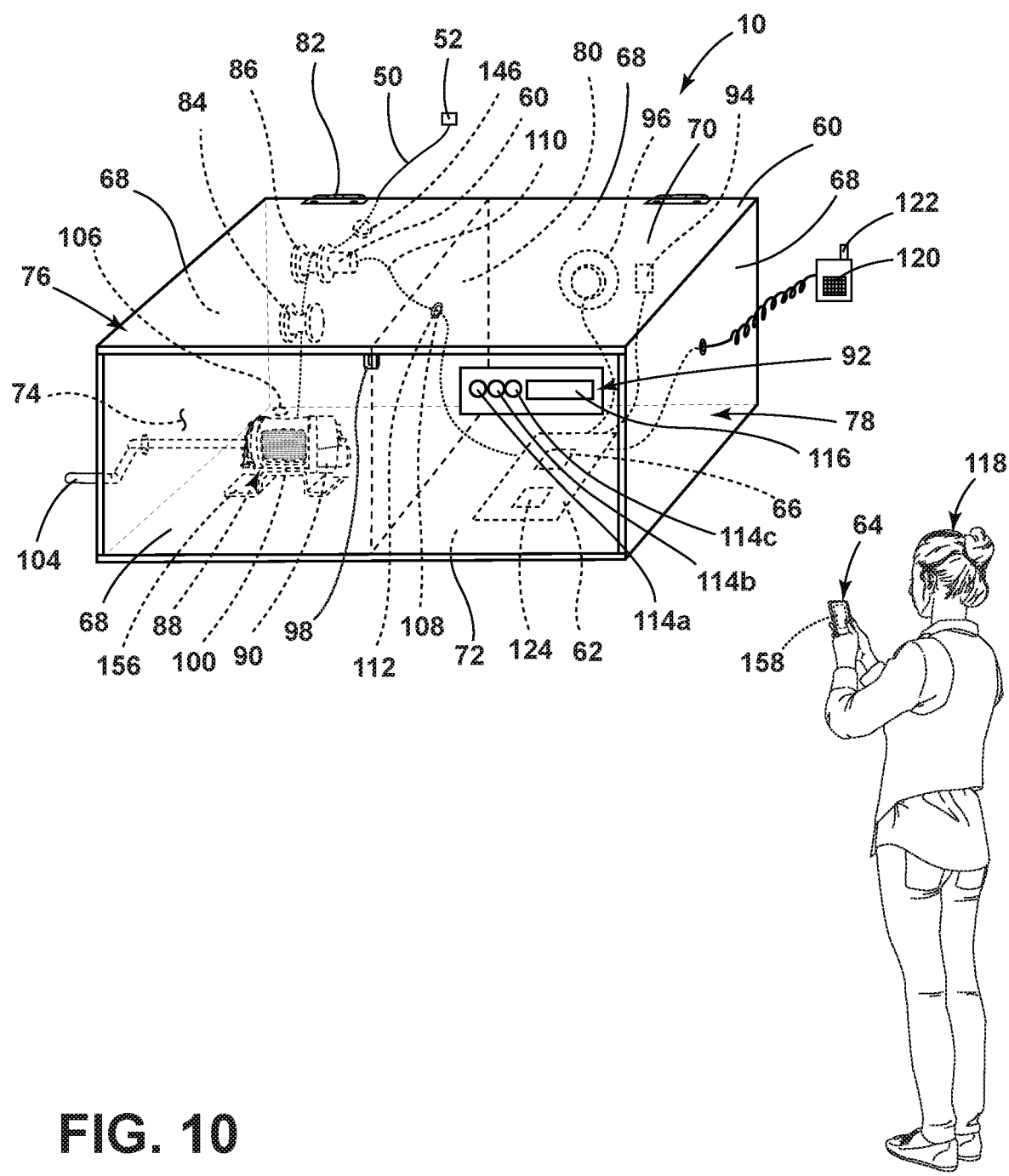
FIG. 10 is a perspective view of the timing device with a reel hand crank extending through a side surface of the housing of the timing device, according to some examples.
Figure 11:
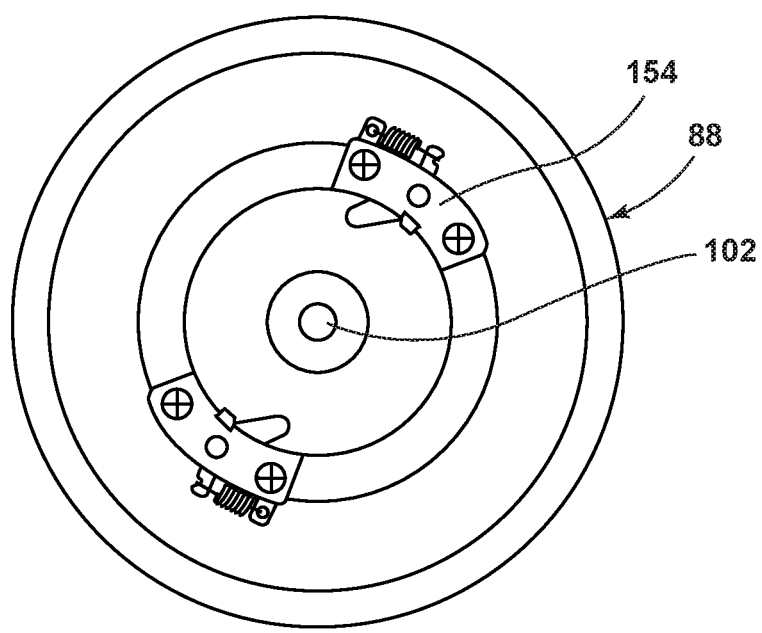
FIG. 11 is a perspective view of a first end portion of the reel, according to some examples.
Figure 12:
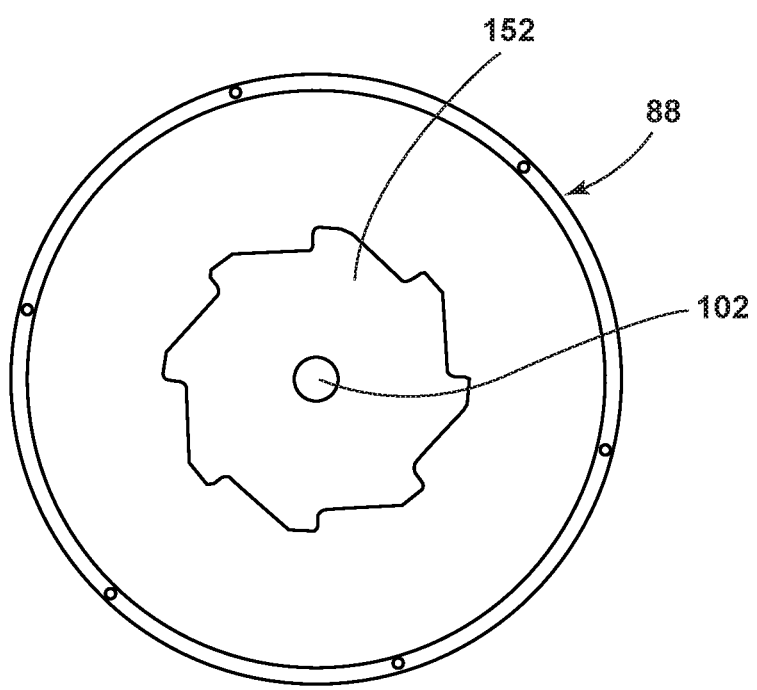
FIG. 12 is a perspective view of a spool and a drive gear operably coupled with the reel, according to some examples.

Referring to FIG. 10, in some examples, the hand crank 104 of the reel 88 may extend through a surface 68, 70, 72 of the housing 58. Accordingly, the hand crank 104 may be utilized to reel 88 the elongated member 50 back around the spool 102 within the housing 58 once the elongated member 50 has extended to the predefined distance $d_F$. The elongated member 50 may be returned to the initial distance $d_0$ with the usage of the hand crank 104 or the elongated member 50 may be returned to a position within the housing 58 with minimal amounts extending through the aperture 146 for storage of the timing device 10. In some examples, the initial distance $d_0$ is recalculated prior to each use of the timing device 10.

With reference to FIGS. 9-12, the motor 134 has an output shaft connected to one or more gears 152. The gears 152 are attached to a clutch 154 that transfers power to the spool 102. A clutch actuation lever is coupled to a cam mechanism (not shown) to allow the user 54 to adjust the contact pressure between the clutch 154 and the spool 102 thereby providing adjustable drag settings. The motorized drive assembly 90 further includes electronics and controls that allow for velocity control and wireless remote actuation. For example, a user 54 may set the velocity upon which the elongated member 50 is reeled around the spool 102 when the clutch 154 is engaged. According to some examples, the elongated member 50 may extend the initial distance $d_0$ from the housing 58 for attaching the elongated member 50 to a user 54. Once the clock 124 within the timing device 10 begins, the clutch 154 may be released so that the spool 102 may rotate with minimal frictional force. Once the predefined distance $d_F$ of elongated member 50 is unwound from the spool 102, as measured by the encoder 60, the clutch 154 may re-engage so that the user 54 will know that the desired distance has been reached. Once the reset switch 114b is actuated, the motorized drive assembly 90 may reel the elongated assembly back into the timing device 10 to the initial distance do, which may also be calculated based on the encoder 60.

Figure 14:
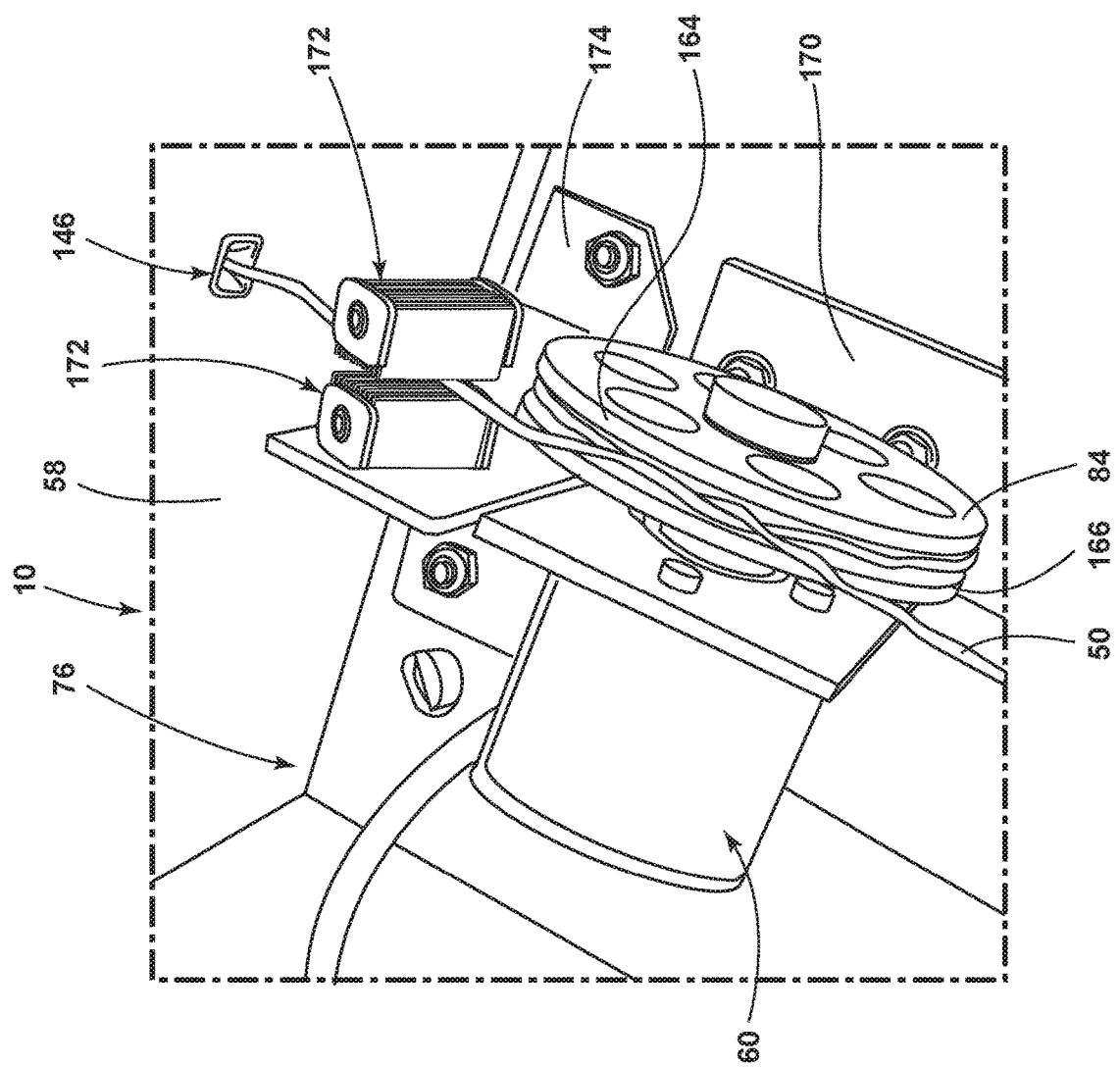
FIG. 14 is an enhanced view of area XIV of FIG. 13.

Referring to FIGS. 13 and 14, the timing device 10 may include the reel 88 and a single wheel 84. The encoder 60 and the wheel 84 may be supported by a base structure 170. A brush 172 may be disposed between the wheel 84 and the aperture 146 in the housing 58. The brush 172 may be configured to remove water and/or any other containment from the elongated member 50 as the elongated member 50 is rewound about the reel 88. The brush 172 may be operably coupled with the base structure 170 or may be disposed on an independent support 174 that is disposed between the wheel 84 and the aperture 146. It will be appreciated that the brush 172 may be replaced with any other structure that is capable of removing water and/or any other containment from the elongated member 50 as it returns to the housing 58 without departing from the scope of the present disclosure.

A guide 176 may be disposed between the reel 88 and the wheel 84 that may be configured to align the elongated member 50 with the wheel 84. In some instances, the guide 176 may be disposed on an independent support 178 that is coupled to the housing 58. As illustrated, the guide 176 includes a base and a frame attached to the base. The base may be referred to as a shoe and is shaped to couple to the support 178. The frame includes an aperture through which the elongated member 50 may be routed. The guide 176 provides guidance both during elongated member 50 deployment as well as when the elongated member 50 is tensioned and/or recovered.

With further reference to FIG. 13, the motorized drive assembly 90 is coupled to the reel 88 through the clutch 154. The clutch 154 may be configured to engage the motor to the reel 88 for returning the elongated member 50 to the reel 88 and release the reel 88 from the motor while the elongated member 50 is being extended from the housing 58. In some examples, the clutch 154 may be configured as a wrap spring clutch 180. Wrap spring clutches 180 are a class of overrunning clutches that allow torque to be transmitted from one shaft to another in only one direction of rotation. The clutch 180 includes a cylindrical input arbor attached to the input hub, a cylindrical output arbor attached to the output hub, and a cylindrical spring 182. The input arbor and the output arbor may be the same diameter and maintained end-to-end in an abutting relationship by a retaining clip, and rotate on a common axis. The spring 182 is connected to the output arbor, slips on the input arbor and acts as self-engaging brake between them. If a torque is applied to the input hub in the direction of arrow A, the spring 182 wraps down tightly onto a shaft formed by the abutting input arbor and the output arbor, which locks the input arbor and the output arbor together and locks the motor to the reel 88. Conversely, when torque is applied in a direction opposite arrow A, the spring 182 unwraps from the shaft formed by the input arbor and the output arbor, which permits the shaft to slip easily in the opposite direction and allows the reel 88 to swing freely so that the elongated member 50 may be extending from the housing 58.

Referring still to FIG. 13, a motor control device 184 may be disposed within the second portion of the housing 58. The motor control device 184 may be operably coupled with the power source 136 and the motorized drive assembly 90 for providing energy to the motor. The motor control device 184 may also be operably coupled with a volt converter 186. The volt converter 186 may be configured to convert the voltage outputted by the power source 136 from a first value to a second value. In some instances, the motorized drive assembly 90 may use a higher voltage than the controller. Accordingly, the power source may supply the first voltage for the motor control device 184 and the volt converter 186 may down-convert the voltage to a second, lower voltage for usage by any and/or all of the remaining components provided herein. It will be appreciated, however, that any component herein may use any voltage without departing from the scope of the present disclosure.

Referring still to FIG. 13, an electrical charging assembly 188 may be operably coupled to the housing 58 and/or the power source. The charging assembly 188 may be configured as a barrel jack connector in some examples. In some instances, the charging assembly 188 may be capable of charging the power source when the timing device 10 is in an OFF state and deactivated when the timing device 10 is in an ON state.

Figure 15:
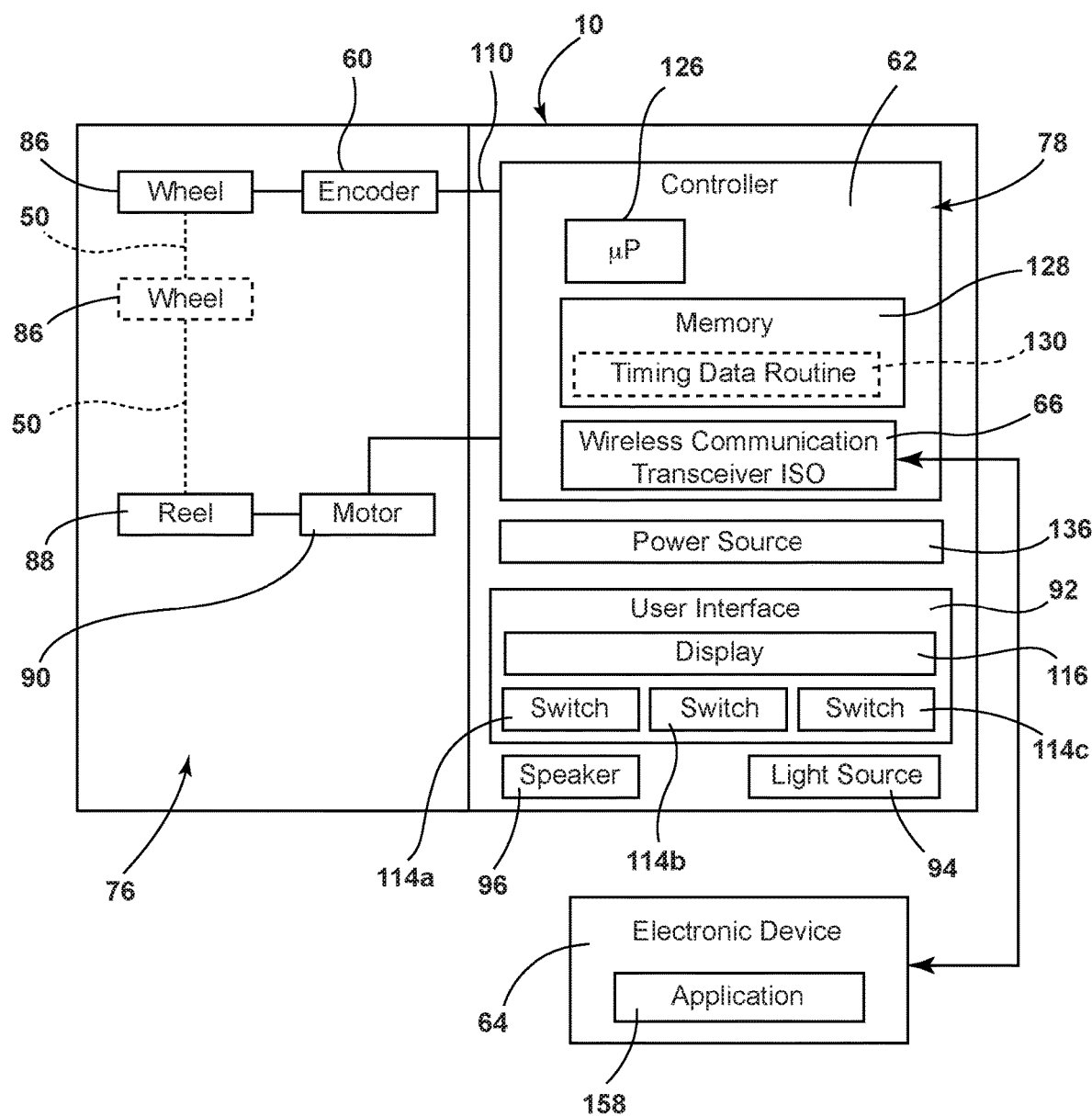
FIG. 15 is a block diagram of the timing device and the electronic device, according to some examples.

Referring to FIG. 15, as provided herein, the compartment 74 of the timing device 10 may include one or more portions 76, 78. According to some examples, the elongated member 50 may be disposed around the reel 88 and first and second wheels 84, 86 within the first portion 76. The first and second wheels 84, 86 may be configured to guide the elongated member 50 from the reel 88 to the aperture 146 defined by the housing 58. The encoder 60 may be operably coupled to the first wheel 84, the second wheel 86, and/or the reel 88 and is configured to detect a rotational velocity. As provided herein, according to some examples, motorized drive assembly 90 may be disposed in the first portion 76 and may be operably coupled with the reel 88 for rewinding the elongated member 50 therearound.

The encoder 60 and/or the motor 134 may be operably coupled to the controller 62 that is disposed within the second portion 78 of the compartment 74. The controller 62 within the timing device 10 may include the processor 126 and memory 128. According to some examples, the clock 124 is disposed in the processor 126 or any other timer or counter may otherwise be disposed within the controller 62, to calculate the time needed for the user 54 of the timing device 10 to move the predefined distance $d_F$. It should be appreciated that the controller 62 may include control circuitry such as analog and/or digital control circuitry.

One or more routines 130 are stored in memory 128 and executed by the processor 126 for processing the various inputs and controlling the timing device 10, as described herein. A power source 136 is connected to the timing device 10. The power source 136 may be a battery that is storable within the housing 58 and/or the timing device 10 may be electrically coupled to an external power source. The timing device 10 may also be equipped with one or more additional sensors for detecting various actions of the user 54 and storing the detected data. Moreover, the user 54 of the timing device 10 may alternatively, or additionally, wear one or more additional sensors for detecting their movement and/or any other desired information.

With further reference to FIG. 15, the application 158 on the electronic device 64 may be configured to utilize a device link interface to interact with the timing device 10. When connected to the timing device 10, the application 158 may be configured to utilize information from the encoder 60, motor 134, and/or any other assembly that is operably coupled to the timing device 10. The application 158 may also be configured to operate when untethered from the timing device 10, such as after the user 54 has completed their usage of the timing device 10.

Referring still to FIG. 15, the timing device 10 may be configured to communicate with one or more remote sites such as a server via a network. The one or more remote sites may include a data store. The server may be one or more computer servers, each generally including at least one processor and at least one memory, the memory storing instructions executable by the processor, including instructions for carrying out various steps and processes described herein. The server may include or be communicatively coupled to a data store for storing the collected data, as well as parameters for evaluating various users 54 of the timing device 10. Further, the server may store information related to multiple users 54 performing various strokes and/or races at various distances.

The timing data routine 130 may process signals from the encoder 60, motor 134, and/or reel 88 to calculate various performance characteristics of a user 54. For example, the timing data routine 130 may provide data that can be used to determine the acceleration of a user 54, instantaneous velocity of the user 54, time to complete the predefined distance $d_F$, etc. As provided herein, an instantaneous velocity means a velocity of the user 54 at each time that is measurable through a pulse of the encoder 60, or another device capable of measuring the extension velocity of the elongated member. Accordingly, the instantaneous velocity will vary based on the capabilities of the chosen encoder 60.

Use of the present disclosure may offer a variety of advantages. For instance, use of the timing device provides more accurate and constant data of a user's performance. The data is continually updated at the pulse rate of the encoder. The timing device may also provide a transportable device that may be used in various environments where current timing devices are ineffective, such as within a pool. Moreover, the timing device may prevent water from contacting non-water resistant electrical components within the timing device by separating the housing into more than one portion. The timing device may include any or all of the features provided herein and still is manufactured at low costs when compared to standard timing assemblies.

According to various examples, a timing device is provided herein. The timing device includes a housing defining an aperture in a surface thereof. An elongated member is extendable from the housing. A wheel is attached to an interior surface of the housing. An encoder is operably coupled to the wheel and is configured to calculate a rotational velocity of the wheel. A controller is configured to calculate a linear velocity of the elongated member based on the rotational velocity of the wheel. Examples of the timing device can include any one or a combination of the following features:
- a user interface disposed on the timing device;
- one or more switches on the user interface and configured to control one or more features of the timing device;
- a display within the user interface;
- a reel within the housing, wherein the elongated member is extended from a spool of the reel and returned to a position within the housing by winding around the spool;
- a motor operably coupled with the reel and configured to rewind the elongated member around the reel upon initiation of the motor;
- a clutch configured to disengage from the reel upon initiation of a clock;
- the clutch re-engages the reel once the elongated member is extended a predefined distance from the housing;
- one or more wireless communication transceivers operably coupled to the controller and configured to interact with an electronic device; and/or
- the electronic device stores information about one or more users or a performance history of the user.

Moreover, a method of manufacturing a timing device is provided herein. The method includes forming a housing that defines an aperture in a surface thereof. An elongated member is positioned within the housing and is extendable from the housing through the aperture. A wheel is disposed within the housing. An encoder is operably coupled to the wheel and is configured to calculate a rotational velocity of the wheel. A controller is configured to calculate a linear velocity of the elongated member based on the rotational velocity of the wheel.

According to some examples, a timing device is provided herein. The timing device includes a housing having a first portion and a second portion separated by a divider. The first portion defines an aperture in the housing. An elongated member is extendable from the housing through the aperture and is configured to couple to a user. A reel is disposed within the first portion of the housing and is configured to wind the elongated member therearound. An encoder is operably coupled with the reel and is configured to calculate a rotational velocity of the reel as the elongated member is unwound from the reel. A controller is disposed within the second portion and is configured to calculate a linear velocity of the user based on the rotational velocity of a wheel. Examples of the timing device can include any one or a combination of the following features:
- a bearing disposed within the aperture, the elongated member configured to extend and retract within a central bore of the bearing;
- a wireless communication transceiver operably coupled to the controller and configured to interact with an electronic device; and/or
- a user interface disposed on the timing device, the user interface containing a switch or a display therein.

According to other examples, a timing device is provided herein. The timing device includes a housing having a plurality of side surfaces, a top surface, and a bottom surface defining a compartment. The compartment has a first portion and a second portion separated by a divider. The top surface is rotatable to provide access to the compartment. An elongated member is extendable from the housing through an aperture in the housing. A reel is disposed within the first portion of the housing. The elongated member is wound around the reel. A controller is operably coupled to the elongated member and is configured to calculate a linear velocity at which the elongated member is extended from the housing. Examples of the timing device can include any one or a combination of the following features:
- a first wheel disposed within the first portion and configured to guide the elongated member through the aperture;
- a second wheel disposed between the reel and the first wheel and configured to guide the elongated member, the first and second wheels having a groove through which the elongated member is guided;
- a wireless communication transceiver operably coupled to the controller and configured to interact with an electronic device;
- the housing is configured to couple to a starting block; and/or
- a speaker, wherein a clock is initiated as the speaker produces an audible sound.

It will be understood by one having ordinary skill in the art that construction of the described invention and other components are not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the device being modified) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A timing device for swimming, comprising:
a housing defining an aperture;
an elongated member extendable from the housing through the aperture in an extension direction;
a wheel rotatable about a wheel axle, wherein the elongated member is wrapped no more than one revolution about the wheel;
a reel including a spool rotatable about a spool axle and positioned at least partially rearward of the wheel along the extension direction and on an opposing side of the wheel from the aperture and positioned within the housing, wherein the elongated member is wrapped more than one revolution about the spool when the elongated member is extended an initial distance from the housing, and wherein the wheel axle is offset from the spool axle;
an attachment member coupled with an end portion of the elongated member and configured to couple to a swimmer;
an encoder coupled to the wheel axle and configured to calculate a rotational velocity of the wheel; and
a controller configured to calculate a linear velocity of the elongated member based on the rotational velocity of the wheel, wherein the elongated member is configured to move with the swimmer as the swimmer moves away from the housing.

2. The timing device of claim 1, further comprising:
a user interface disposed on the timing device.

3. The timing device of claim 2, further comprising:
one or more switches on the user interface and configured to control one or more features of the timing device.

4. The timing device of claim 2, further comprising:
a display within the user interface.

5. The timing device of claim 1, wherein the elongated member is fixed to a spool of the reel and returned to a position within the housing by winding around the spool.

6. The timing device of claim 5, further comprising:
a motor operably coupled with the reel and configured to rewind the elongated member around the reel upon initiation of the motor.

7. The timing device of claim 5, further comprising:
a clutch configured to disengage from the reel upon initiation of a clock.

8. The timing device of claim 7, wherein the clutch re-engages the reel once the elongated member is extended a predefined distance from the housing.

9. The timing device of claim 1, further comprising:
one or more wireless communication transceivers operably coupled to the controller and configured to interact with an electronic device.

10. The timing device of claim 9, wherein the electronic device stores information about one or more users or a performance history of the user.

11. A timing device for swimming, comprising:
a housing having a first portion and a second portion separated by a divider, the first portion defining an aperture in the housing;
an elongated member extendable from the housing through the aperture;
a reel disposed within the first portion of the housing and configured to wind the elongated member therearound, wherein the reel is rotatable about a spool axle;
a wheel rotatable about a wheel axle, wherein the wheel axle is offset from the spool axle;
an encoder operably coupled with the wheel and configured to calculate a rotational velocity of the wheel, wherein a rotational axis of the encoder is non-parallel to a rotational axis of the reel; and
a controller disposed within the second portion and configured to calculate a linear velocity of the elongated member based on the rotational velocity of the wheel as a user moves from an initial distance from the housing to a predefined distance from the housing, the initial distance being less than the predefined distance.

12. The timing device of claim 11, further comprising:
a wireless communication transceiver operably coupled to the controller and configured to interact with an electronic device.

13. The timing device of claim 11, further comprising:
a user interface disposed on the timing device, the user interface containing a switch or a display therein.

14. The timing device of claim 11, wherein the housing defines a first portion and a second portion separated by a divider, the aperture defined by a first side surface of the first portion and a drain defined by a bottom surface of the first portion.

15. A timing device, comprising:
a housing defining a compartment;
an elongated member extendable from the housing through an aperture defined by the housing in an extension direction;
a reel disposed within the housing, the elongated member configured to wrap more than one revolution about the reel, the reel rotatable about a first rotational axis;
a first wheel rotatable about a second rotational axis, the second rotational axis positioned forwardly of the first rotational axis rearwardly of the aperture relative to the extension axis, wherein the first wheel is configured to rotate through contact with a portion of the elongated member;
an encoder operably coupled to the first wheel, the encoder configured to calculate a rotational velocity of the first wheel; and
a controller operably coupled to the encoder and configured to calculate a linear velocity at which the elongated member is extended from the housing during a timing sequence based on a rotational velocity of the first wheel, wherein a generally consistent resistance is provided by the elongated member during the timing sequence, and wherein the elongated member is configured to be attached to a user and move with the user as the user moves from an initial distance from the housing to a predefined distance from the housing during the timing sequence.

16. The timing device of claim 15, further comprising:
a second wheel disposed within the first portion and configured to guide the elongated member through the aperture.

17. The timing device of claim 15, further comprising:
a wireless communication transceiver operably coupled to the controller and configured to interact with an electronic device.

18. The timing device of claim 17, wherein the electronic device includes an application that creates one or more data displays based on data provided from the wireless communication transceiver.

19. The timing device of claim 15, further comprising:
a gasket positioned within a divider separating the first portion and a second portion of the housing; and
a wire electrically coupling the encoder and the controller, wherein the wire extends through the gasket.

20. The timing device of claim 15, wherein the elongated member is wound into the housing to remove slack in the elongated member between the housing and a user, and wherein the timing sequence proceeds once the elongated member reaches a predefined tension.

* * * * *